US012656294B2

(12) United States Patent
Ortiz

(10) Patent No.: US 12,656,294 B2
(45) Date of Patent: Jun. 16, 2026

(54) SYSTEMS AND METHODS FOR AN ENHANCED BIOSENSOR ELECTRODE

(71) Applicant: E-Sentience, Inc., Newark, NJ (US)

(72) Inventor: Julio Fredin Ortiz, Newark, NJ (US)

(73) Assignee: E-Sentience, Inc., Newark, NJ (US)

( * ) Notice: Subject to any disclaimer, the term of this patent is extended or adjusted under 35 U.S.C. 154(b) by 172 days.

(21) Appl. No.: 18/668,141

(22) Filed: May 18, 2024

(65) Prior Publication Data

US 2024/0385138 A1    Nov. 21, 2024

Related U.S. Application Data

(60) Provisional application No. 63/503,038, filed on May 18, 2023.

(51) Int. Cl.
G01N 27/327 (2006.01)

(52) U.S. Cl.
CPC ..... G01N 27/3277 (2013.01); G01N 27/3278 (2013.01)

(58) Field of Classification Search
CPC ...................... G01N 27/3277; G01N 27/3278
See application file for complete search history.

(56) References Cited

U.S. PATENT DOCUMENTS 5,972,199 A * 10/1999 Heller .................... C12Q 1/005
                                                     204/403.12
2008/0017522 A1 * 1/2008 Heller ................ A61B 5/14865
                                                     600/300

2008/0026369 A1    1/2008  Dual et al.
2010/0216175 A1    8/2010  Melker et al.
2015/0014164 A1    1/2015  Lee et al.
2019/0139713 A1    5/2019  Choi
2023/0019924 A1    1/2023  Reiserer et al.
2023/0256435 A1    8/2023  Neilson et al.
2024/0049994 A1 *  2/2024  Yin .................... A61B 10/0064
2024/0062922 A1    2/2024  Acherr et al.
2024/0076186 A1    3/2024  Kondiboyina et al.

OTHER PUBLICATIONS

Tang et al. , Touch-based stressless cortisol sensing, Advanced Materials, 2021, 33, 2008465 (Year: 2021).*
Mei et al., Wearable molecularly imprinted electrochemical sensor with integrated nanofiber-based microfluidic chip for in situ monitoring of cortisol in sweat, Sensors and Actuators B: Chemical ,2023, 381, 133451 (Year: 2023).*

(Continued)

*Primary Examiner* — Shizhi Qian
(74) *Attorney, Agent, or Firm* — Alpine Patents LLC; Brian Van Osdol

(57)                ABSTRACT

Systems and methods for an enhanced electrochemical sensor may include a sensing electrode that includes conductive layer deposited on a substrate; a molecular imprinted polymer layer deposited on top of the conductive layer; a hydrogel guard layer deposited on top of the molecular imprinted polymer layer; and a redox mediator material integrated within the hydrogel guard layer. The sensing electrode may be integrated into a sensing electrode system with a reference electrode and counter electrode, which may be used in forming or operating an electrochemical sensing device.

18 Claims, 14 Drawing Sheets

100

Redox Mediator Material 150

Targeted Molecule

Hydrogel Guard Layer 140

Molecular imprinted polymer layer 130

Nanoparticles 132

Conductive Layer 120

Substrate 110

(56) References Cited

OTHER PUBLICATIONS

Goyal et al., Development of a redox-label-doped molecularly imprinted polymer on—cyclodextrin/reduced graphene oxide for electrochemical detection of a stress biomarker, ACS Omega, 2022, 7, 33491-33499 (Year: 2022).*

Gillan et al., Molecularly imprinted polymer on roll-to-roll printed electrodes as a single use sensor for monitoring of cortisol in sweat , Flex. Print. Electron., 2022, 7, 025014 (Year: 2022).*

Fatoni et al., A novel molecularly imprinted chitosan-acrylamide, graphene, ferrocene composite cryogel biosensor used to detect microalbumin, Analyst, 2014, 139, 6160 (Year: 2014).*

Moro et al., Redesigning an Electrochemical MIP Sensor for PFOS: Practicalities and Pitfalls, Sensors, 2019, 19, 4433 (Year: 2019).*

Liu et al., Flexible Electrochemical Urea Sensor Based on Surface Molecularly Imprinted Nanotubes for Detection of Human Sweat, Analytical Chemistry, 2018, 90, 13081-13087 (Year: 2018).*

* cited by examiner

200

Counter Electrode 220

Enhanced Working Electrode 100

Reference Electrode 210

300

Sensor
Controller 320

Sensor Electrode System 200

Sample Collector 310

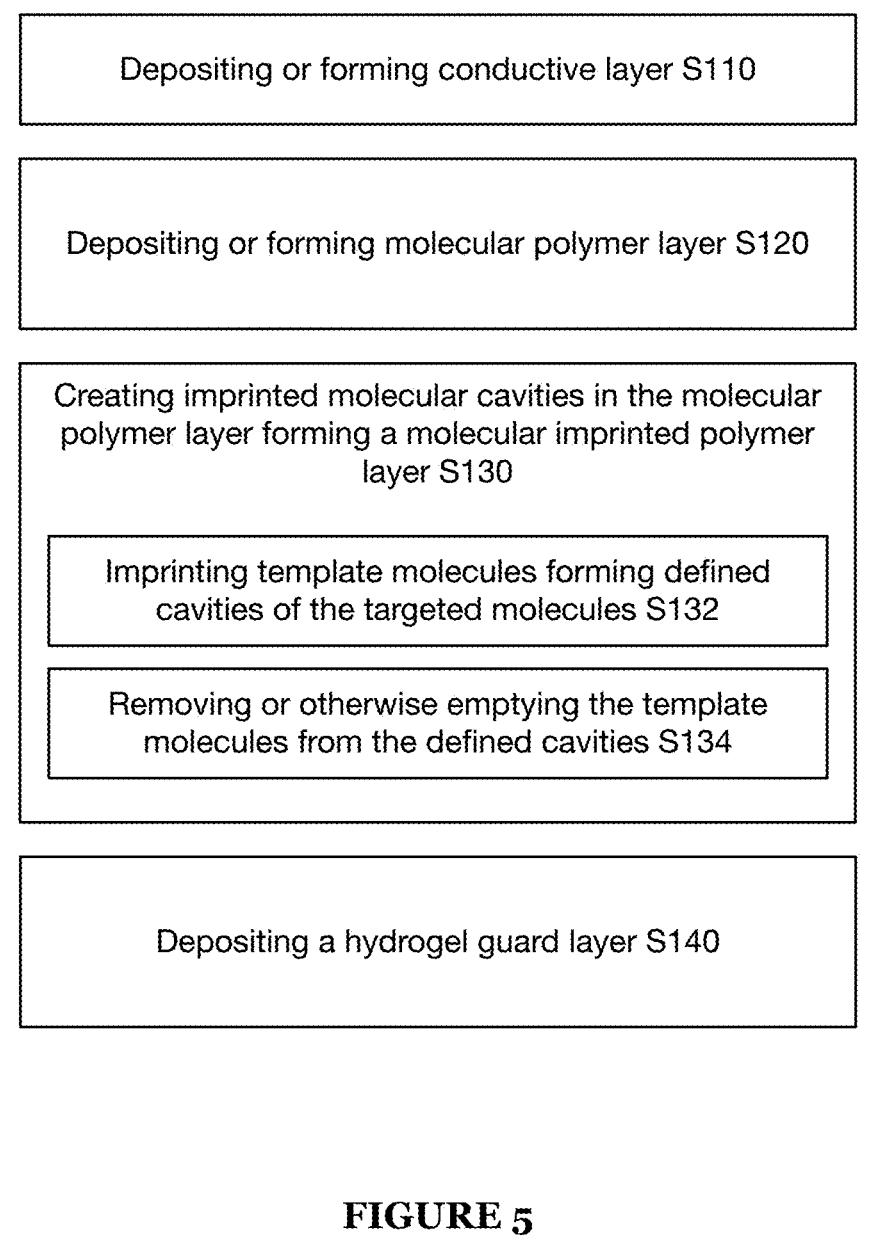

Depositing or forming conductive layer S110

Depositing or forming molecular polymer layer S120

Creating imprinted molecular cavities in the molecular polymer layer forming a molecular imprinted polymer layer S130

Imprinting template molecules forming defined cavities of the targeted molecules S132

Removing or otherwise emptying the template molecules from the defined cavities S134

Depositing a hydrogel guard layer S140

FIGURE 5

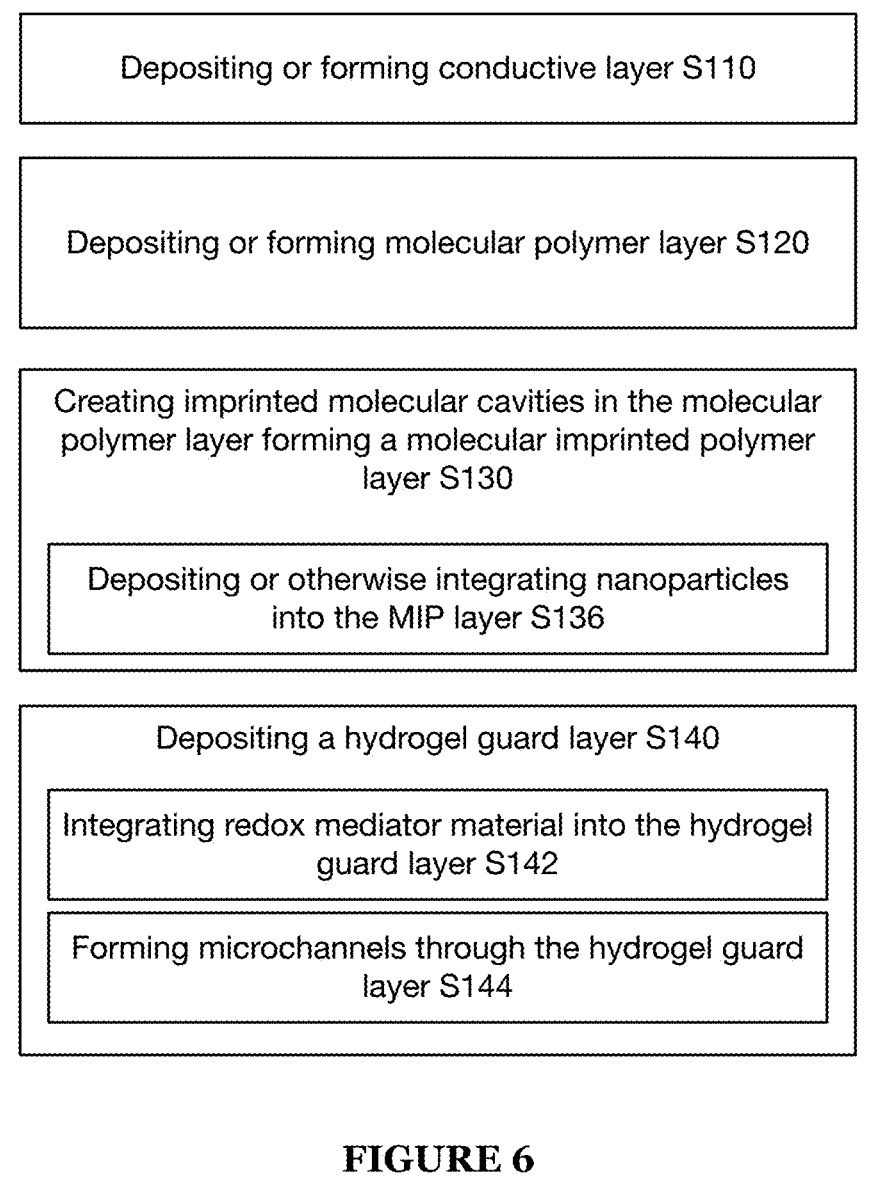

Depositing or forming conductive layer S110

Depositing or forming molecular polymer layer S120

Creating imprinted molecular cavities in the molecular polymer layer forming a molecular imprinted polymer layer S130

Depositing or otherwise integrating nanoparticles into the MIP layer S136

Depositing a hydrogel guard layer S140

Integrating redox mediator material into the hydrogel guard layer S142

Forming microchannels through the hydrogel guard layer S144

FIGURE 6

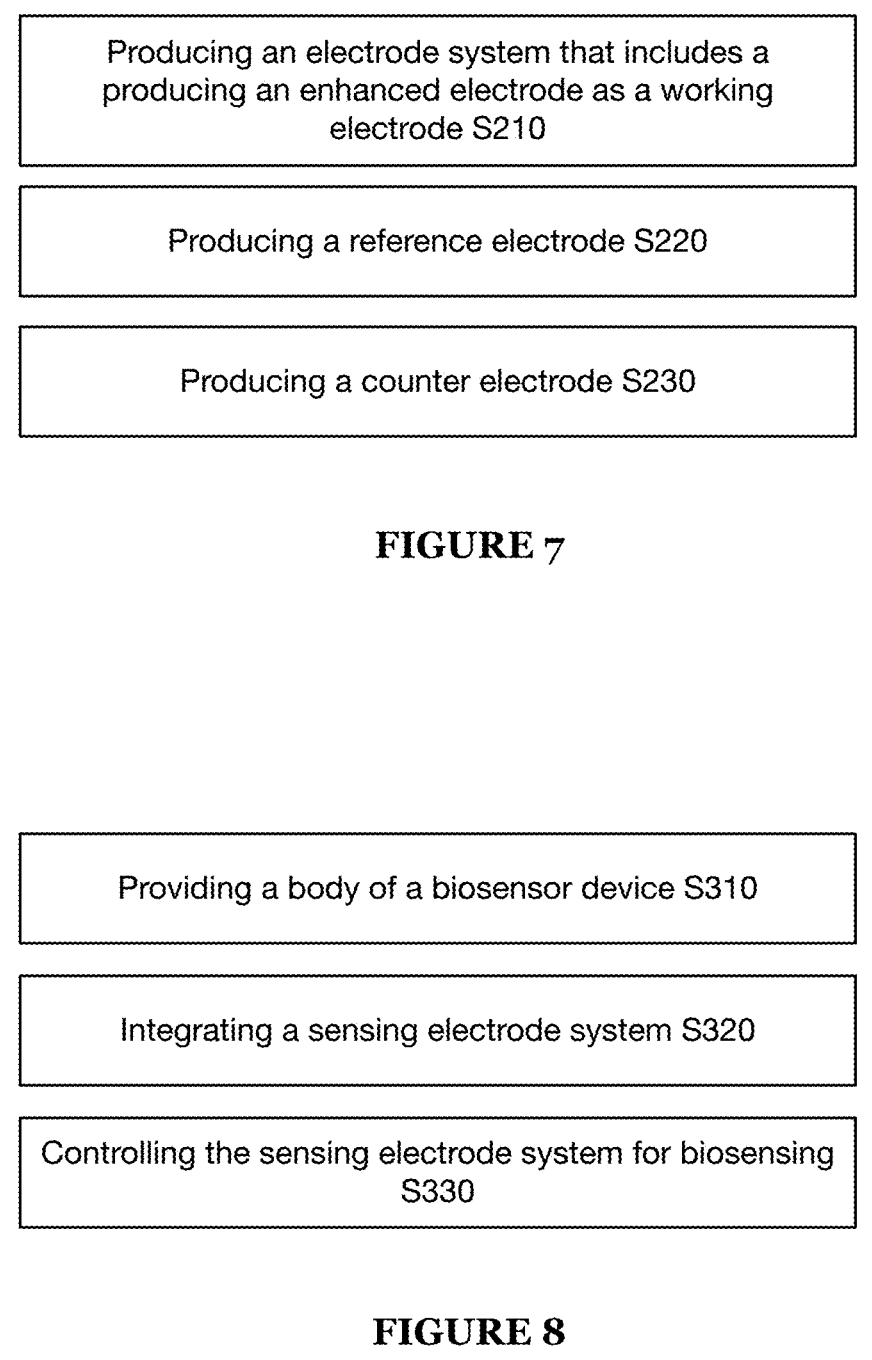

Producing an electrode system that includes a producing an enhanced electrode as a working electrode S210

Producing a reference electrode S220

Producing a counter electrode S230

FIGURE 7

Providing a body of a biosensor device S310

Integrating a sensing electrode system S320

Controlling the sensing electrode system for biosensing S330

FIGURE 8

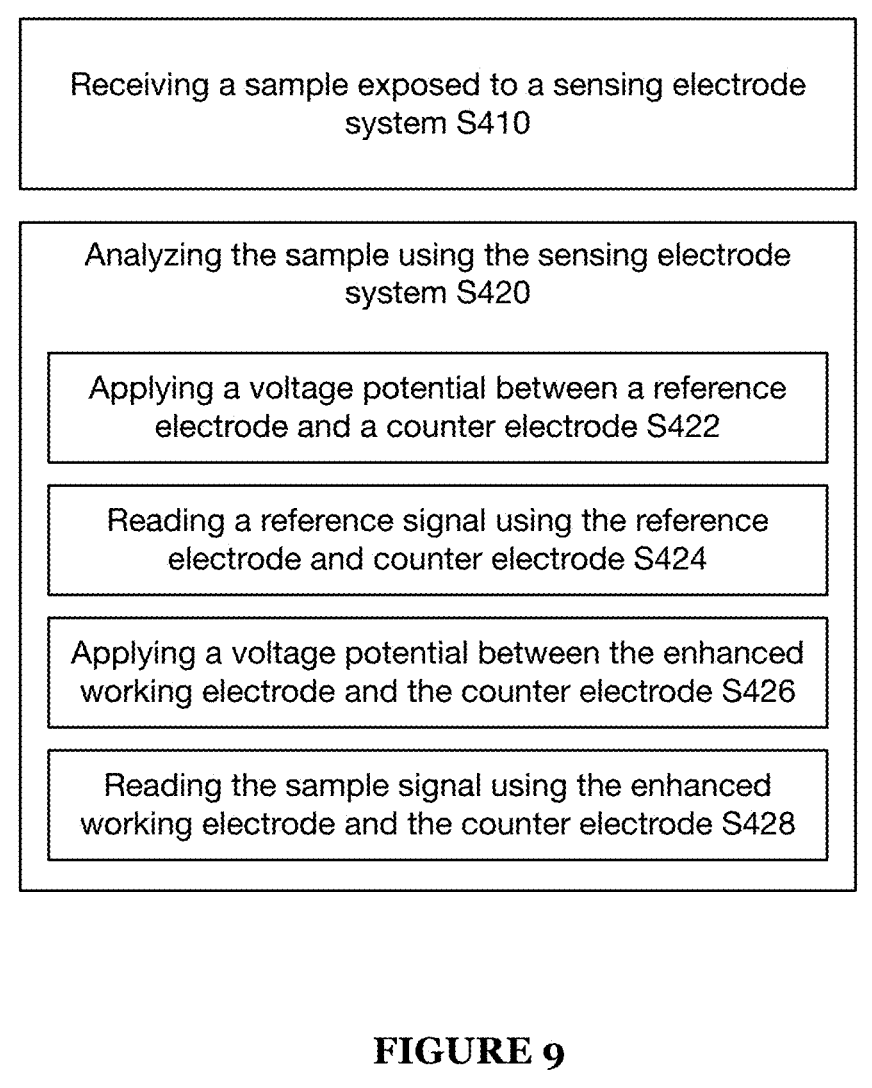

Receiving a sample exposed to a sensing electrode system S410

Analyzing the sample using the sensing electrode system S420

Applying a voltage potential between a reference electrode and a counter electrode S422

Reading a reference signal using the reference electrode and counter electrode S424

Applying a voltage potential between the enhanced working electrode and the counter electrode S426

Reading the sample signal using the enhanced working electrode and the counter electrode S428

FIGURE 9

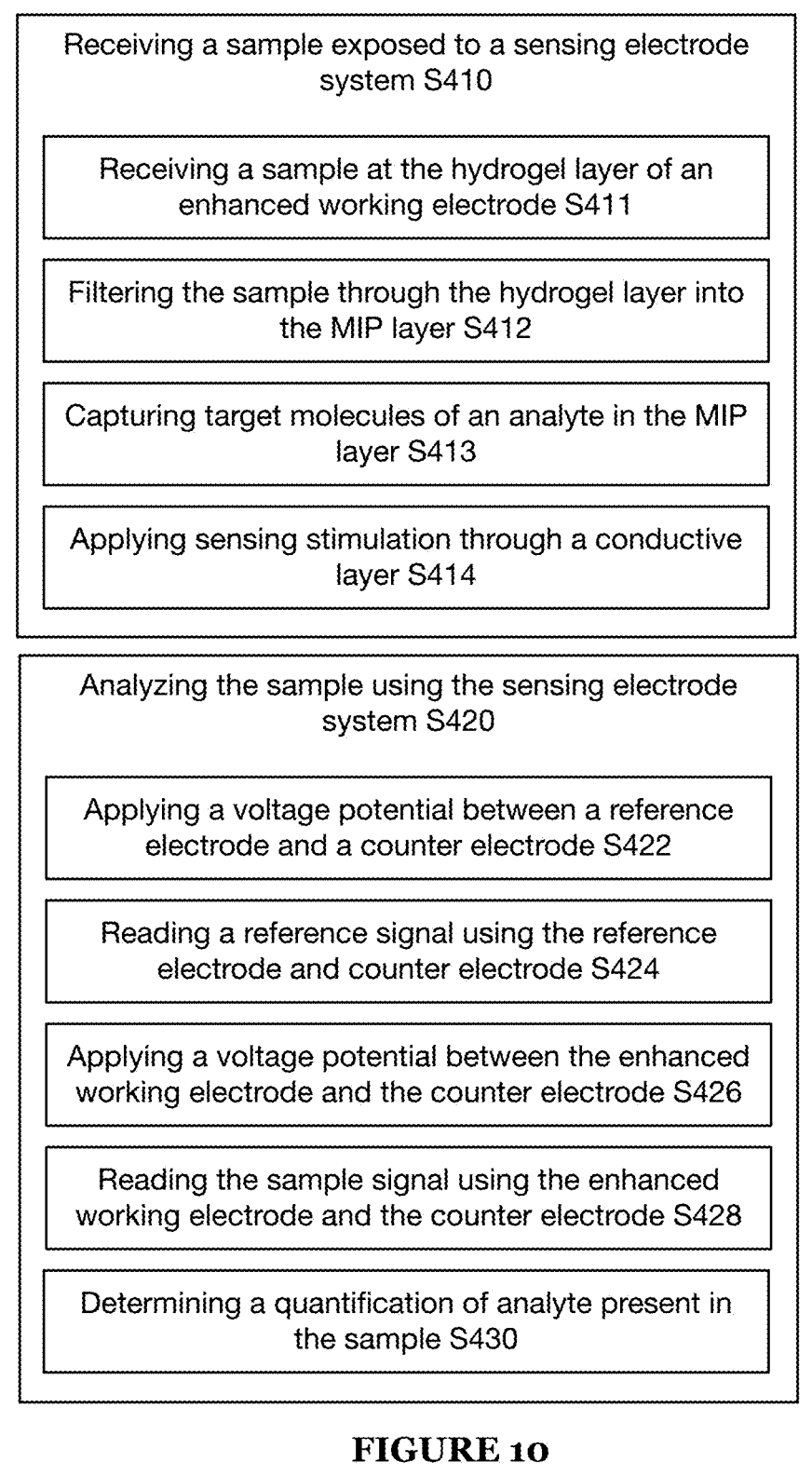

Receiving a sample exposed to a sensing electrode system S410

Receiving a sample at the hydrogel layer of an enhanced working electrode S411

Filtering the sample through the hydrogel layer into the MIP layer S412

Capturing target molecules of an analyte in the MIP layer S413

Applying sensing stimulation through a conductive layer S414

Analyzing the sample using the sensing electrode system S420

Applying a voltage potential between a reference electrode and a counter electrode S422

Reading a reference signal using the reference electrode and counter electrode S424

Applying a voltage potential between the enhanced working electrode and the counter electrode S426

Reading the sample signal using the enhanced working electrode and the counter electrode S428

Determining a quantification of analyte present in the sample S430

FIGURE 10

○  Empty Cavity

●  Filled Cavity

◇  Nanomaterial

——▶  Electron Pathway

----▶  Blocked Electron Pathway

SYSTEMS AND METHODS FOR AN ENHANCED BIOSENSOR ELECTRODE

CROSS-REFERENCE TO RELATED APPLICATIONS

This application claims the benefit of U.S. Provisional Application No. 63/503,038, filed on 18 May 2023, which is incorporated in its entirety by this reference.

FEDERALLY SPONSORED RESEARCH AND DEVELOPMENT

This invention was made with government support under Grant No. W51701-23-C-0254 awarded by the U.S. Army. The government has certain rights in the invention.

TECHNICAL FIELD

This invention relates generally to the field of biosensor, and more specifically to a new and useful system and method for an enhanced biosensor electrode.

BACKGROUND OF THE INVENTION

The field of biomarker monitoring plays a critical role in various health applications such as diagnosing diseases, assessing health conditions, and tracking treatment progress. However, there are several issues and challenges associated with the current state of this technology field.

One common issue is that many traditional monitoring approaches tend to be slow and expensive. They often involve time-consuming analytical procedures, expensive laboratory equipment, and the need for highly trained personnel. As a result, the cost and complexity of these approaches can limit their accessibility and usefulness for routine monitoring.

Another limitation is that these monitoring processes typically require the subject to visit a testing facility in person to provide a sample for analysis. This inconvenience can result in reduced compliance, delays in obtaining results, and limited applicability for situations where continuous or point-of-care monitoring would be preferable.

Thus, there is a need in the biosensor field to create a new and useful system and method for an enhanced biosensor electrode. This invention provides such a new and useful system and method.

BRIEF DESCRIPTION OF DRAWINGS

FIGS. 5-10 are flowchart representation of method variations for production and operation of a biosensor.

DETAILED DESCRIPTION OF THE EMBODIMENTS

The following description of the embodiments of the invention is not intended to limit the invention to these embodiments but rather to enable a person skilled in the art to make and use this invention.

1. Overview

Systems and methods for an enhanced electrochemical sensor function to detect and/or measure levels of one or more types of molecules. The systems and methods preferably utilize an enhanced electrode that can react to and measure one or more types of target molecules as a result of a molecular impression process within a polymer layer guarded by a hydrogel guard layer. The systems and methods operate based on nano-scale cavities within the enhanced electrode that can selectively bind with target molecules when the molecule is present in a sample, and thereby causing changes in the electrochemical properties of the electrode.

The systems and methods may utilize 2D printing technology enabling a more portable and mobile sensing platform. The systems and methods may employ a hydrogel guard layer with redox mediators, that function to promote isolation of targeted molecules that migrate into a polymer layer where the targeted molecules electrochemically influence electrical sensing of the electrode.

Figure 1:
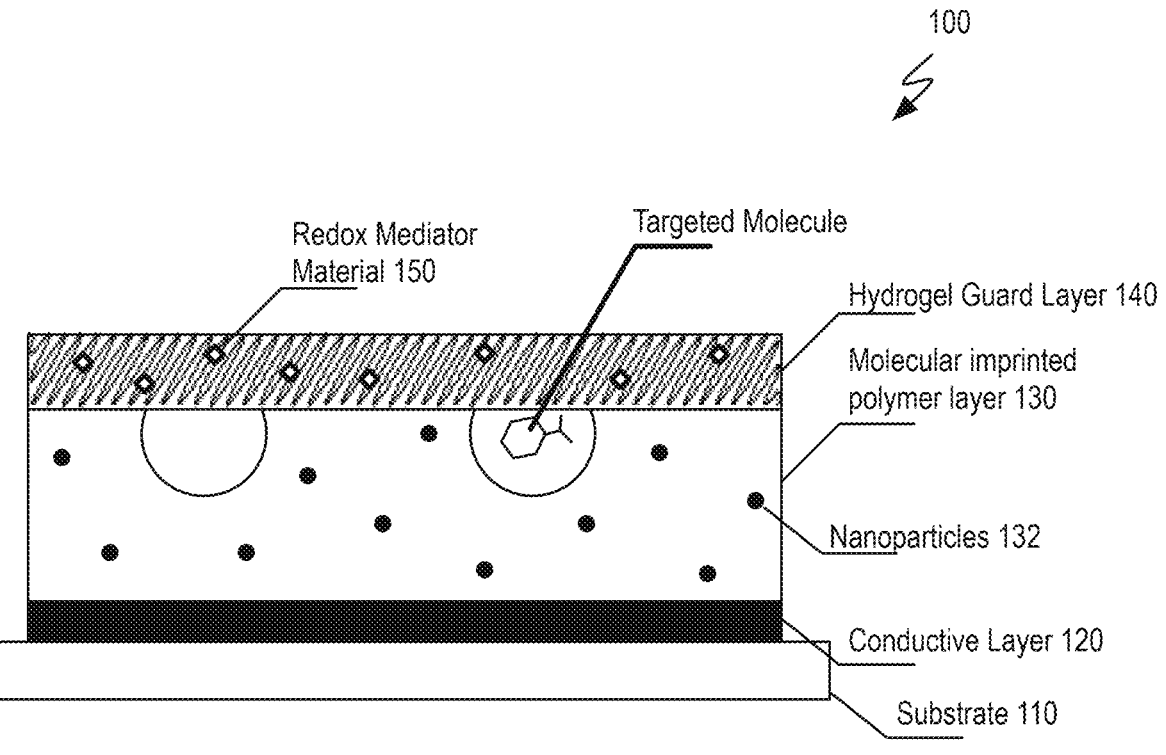
FIG. 1 is a schematic representation of one system variation of an enhanced electrode.

In some embodiments, the systems and methods may be implemented in connection with a specialized enhanced electrode. The enhanced electrode is comprised of multiple layers or structures, which may include a hydrogel guard layer, a molecular imprinted polymer layer, and a conductive layer as shown in FIG. 1. These layers collectively function as a filter, a sensing element, and a highly conductive electrode element, enabling precise and accurate molecule detection.

The enhanced electrode may be imprinted and customized for a variety of different targeted analytes. In particular, the enhanced electrode may target measuring of hormones, electrolytes, and/or inflammatory markers.

Figure 3:
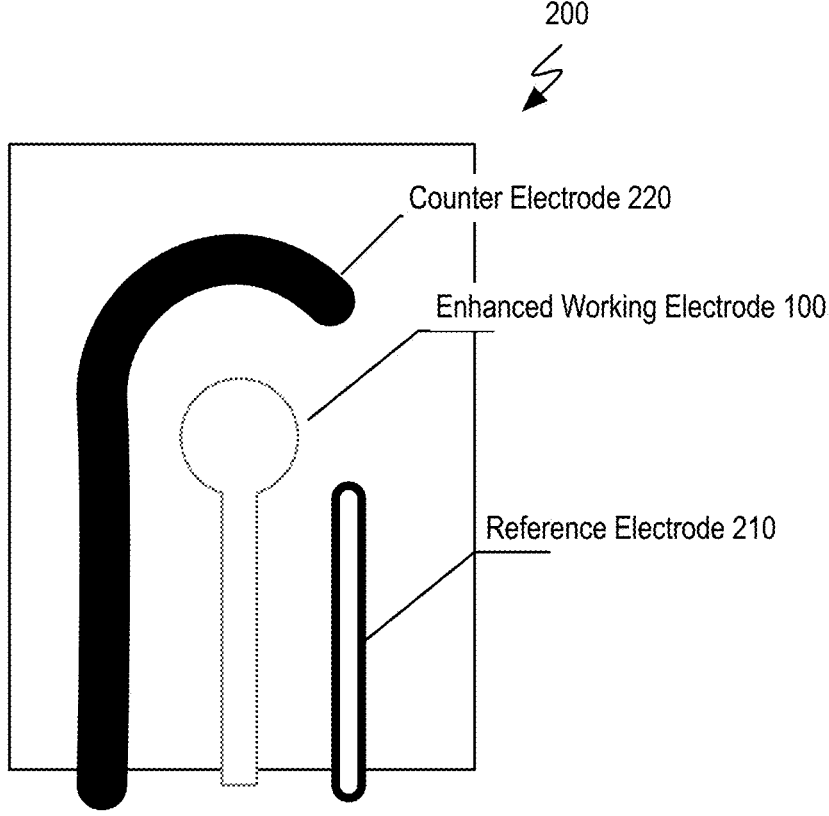
FIG. 3 is a schematic representation of a sensing electrode system.

In some embodiments, the enhanced electrode can be integrated into a sensing electrode system. In particular, the enhanced electrode may be integrated as part of a potentiostat sensor, which may additionally include a reference electrode and a counter electrode, as shown in FIG. 3. This configuration allows for additional calibration and reference signals, resulting in improved interpretation of measurements obtained from the enhanced electrode.

Embodiments including a sensing electrode system may utilize 2D fabrication design such that the sensing electrode may be printed or otherwise produced through stacked layering of electrochemical components. In this way, the systems and methods described herein may be used in making small form-factor sensing electrodes, which may be integrated into biosensor devices. For example, the sensing electrode may be part of a sensing strip that can be affordably used and replaced. This may enable more regular testing, and easier testing, which may open up at-home and/or mobile testing of various analytes.

As such, the systems and methods may additionally be used as part of a biosensor system or device, where one or more sensing electrode systems are integrated with a sample collector and sensor controller, creating a versatile biosensor device. Such a device can be designed with various form factors to cater to different application requirements.

The systems and methods may be particularly useful in testing biosamples that can be delivered in various conditions. Biosample droplets (e.g., from spit or sweat) may be non-heterogenous and can have both large molecules and different particles, cells, viruses in them. The specially configured enhanced working electrode with its hydrogel guard layer may help filter out particles larger than a micron as well as regulate both conductivity and temperature of the solution in contact with the working electrode.

This inventive system and method may offer a significant advancement in the field of molecular detection by providing a highly sensitive and selective enhanced working electrode, capable of being utilized in diverse sensing electrode systems and biosensor devices.

The systems and methods may be adapted or configured for monitoring a wide variety of different types of molecules. This may be particularly useful when used as part of a biosensor, but this may be used in any suitable type of chemical/substance analysis monitoring use case.

In one use-case, the systems and methods may be used in connection with hormone measurement or monitoring. In one example cortisol levels may be monitored using the systems and methods. Cortisol molecules or corresponding template molecules may be used in creating defined cavity impressions in a polymer layer of the enhanced electrode. A cortisol contained in a tested sample passes through the hydrogel guard layer and becomes captured in the defined cavity impressions thereby changing electrical characteristics of the working electrode. These changes can be detected and measured to assess the quantity of cortisol in a sample. The working electrode may be configured with defined cavities for testing and evaluating quantities of other targeted molecules or combinations of molecules.

In another use-case, the systems and methods may be used in connection with disease biomarker detection such as tracking for one or more biomarkers associated with a disease or condition such as cancer, Alzheimer's, cardiovascular disorders, Diabetes, Kidney disease, liver disease, thyroid disorders, and the like.

In another use-case, the systems and methods may be used in connection with hydration and/or nutrition monitoring. The systems and methods may be used to measure electrolytes, ions, salts or lactate, a byproduct of glucose breakdown, and/or any other nutrition or hydration related markers.

As another related use-case, the systems and methods may be used in connection with monitoring metabolic markers such as urea or creatinine. The system and method could similarly be used in monitoring chronic health conditions such as heart failure and/or chronic kidney disease.

In another use-case, the systems and methods may be used in connection with food safety testing, where food-borne pathogens or toxins can be monitored.

In one use-case, the systems and methods may be used in connection of environmental monitoring, wherein an enhanced electrode is configured for monitoring for specific molecules.

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

As one potential benefit, the system and method may enable improved sensing performance in biosensors, resulting in greater accuracy and sensitivity. This enhanced capability allows for more reliable detection and measurement of a targeted molecules, which can be crucial in various applications such as disease diagnosis or environmental monitoring. The system and method use molecular impression polymer (MIP) layer that can specifically target a variety of molecules, while using a hydrogel guard layer to reduce contamination and particle noise for increased selectivity of molecules in the MIP layer. Additionally, integration of nanoparticles may provide conductivity that functions to improve sensing limits of analyte detection.

As another potential benefit, the system and method may provide a flexible platform that can be adapted to a variety of use-cases, form factors, and applications. The systems and methods may be calibrated for targeting a variety of different types of molecules. This adaptability enables the development of customized solutions tailored to specific needs, whether it be in healthcare, environmental monitoring, food safety, or industrial processes.

As an additional potential benefit, the system and method may offer non-invasive or minimally invasive sample collection methods. By using a design enabling testing of biological fluids such as sweat or saliva, the systems and methods may enable more comfortable and user-friendly monitoring options, which could increase patient compliance and facilitate continuous tracking of health markers. For example, resilience of the enhanced working electrode against non-homogeneous samples, can make administration of testing more accessible to those not trained in sample handling. Accordingly, in some variations, subjects may self-administer testing by following simple instructions for supplying a sample to a biosensor device. In some cases, this may include spitting onto a testing strip/component or even adhering or otherwise wearing a biosensor device such that a sample can passively be collected by the biosensor device (e.g., absorption of sweat).

Furthermore, the system and method may allow for real-time or near-real-time analysis of biomarkers. Faster data acquisition and processing can lead to more timely decision-making and intervention, helping healthcare providers and individuals manage health conditions more effectively. A traditional chromatographic technique may require a sample to elute through a column for over an hour in addition to requiring time for sample preparation. The system and method may be sufficiently easier to administer and faster when processing a sample.

As another potential benefit, the system and method may enable the development of cost-effective diagnostic or monitoring tools. The systems and methods may lend themselves to use of 2D printing, deposition techniques, and layer-based thin-film manufacturing techniques. This may make the enhanced working electrode and/or the sensing electrode system as a whole, easier to manufacture and with substantially low cost for each sensing electrode. Due to the adaptable nature of the platform and potential for simpler detection methods, these tools could be made more affordable, increasing access to vital diagnostics and monitoring capabilities for a wider range of users.

2. System

As shown in FIG. 1, the system of one embodiment may be implemented as an enhanced electrode 100. The system may be used to process a sample to detect and quantify a specific analyte (i.e., target molecule). The enhanced electrode functions to provide variable electrical properties based on exposure to a sample and the amount of an analyte in the sample.

The enhanced electrode 100 is preferably prepared and configured for reacting to one or more types of target molecules. More specifically, the enhanced electrode 100 is prepared through an imprintation process where targeted molecules are used to create nano-scale cavities defined in portions of the enhanced electrode 100. When used, those cavities may be filled by the targeted molecules if the molecule is present and moves into the cavity. The number of cavities filled by molecules results in changing electrical properties of the enhanced electrode 100.

The enhanced electrode 100 preferably includes a set of layers or structures that function as a filter, a sensing element, and a highly conductive electrode element. In particular, the enhanced electrode 100 may include a conductive layer 120 deposited on a substrate 110, a molecular imprinted polymer (MIP) layer 130 deposited on the conductive layer 120, a hydrogel guard layer 140 on the conductive layer 120. The hydrogel guard layer 140 can include a redox mediator material 150 integrated within the hydrogel guard layer 140. The MIP layer 130 is imprinted with template molecules defining cavities for a target molecule or molecules of an analyte of interest. In some variations, the MIP layer 130 may additionally include integrated nanoparticles 132 to further facilitate enhanced sensing capabilities of the enhanced electrode 100 as shown in FIG. 1.

The hydrogel guard layer 140 in connection with the redox mediator material 150 functions to filter non-targeted particles and molecules while allowing targeted molecules of the analyte to transition or diffuse into the MIP layer 130. Within the MIP layer, the analyte will have individual molecule instances captured in the defined cavities of the MIP layer 130, which thereby alters electrical properties when driving the electrode via the conductive layer 120.

The substrate 110 functions as a non-conductive layer on which the electrode and/or electrode sensing system can be built. The substrate 110 is preferably a non-conductive material. In one variation, the substrate 110 may be a ceramic material, but any suitable non-conductive material may be used. However, there may be alternative variations where a conductive substrate is used. In such variations, the substrate region of an electrode is preferably conductively isolated from other electrodes and/or electrical components.

The substrate 110 may be a rigid or a flexible material. In some variations, the substrate 110 may be a substantially flat planar surface. However, the substrate 110 may alternatively have a non-flat surface geometry. The electrode and electrode system may use printing and/or deposition manufacturing techniques and as such the working electrode and more generally a sensing electrode system may be built up as layers on any arbitrary surface of a substrate 110. In some variations, the substrate 110 may be a structural component of some element which could have a form customized for the use case. As an example of the system's adaptability, an enhanced working electrode could be assembled on an inner or outer curved surface of a cylindrical tube-like structure.

The conductive layer 120 functions as a conductive part of the electrode stack serving as a receptacle for current in an enhanced electrode system. The conductive layer 120 is preferably a layer adjacent to and in conductive contact with the MIP layer 130. The conductive layer 120 will additionally be coupled to a controlling electrical system such that an external electrical system can control application of electric potential to the conductive layer 120.

The conductive layer 120 preferably enables an electrical current to be driven using the conductive layer 120 through the MIP layer 130 so as to measure the current/impedance and assess/quantify presence of an analyte. In addition to conductivity characteristics, the conductive layer 120 may additionally function as an EMI (electromagnetic interference) shield that can protect the 2nd stack from external noise.

The conductive layer 120 in one variation is made of a MXene material and as such may be a MXene conductive layer 122. In some variations, the MXene layer may more particularly be a MXene carbon layer that is a mixture of carbon and MXene material. This may increase layer thickness and strength. The conductive layer 120 may alternatively be made of carbon black, graphene, gold, silver, and/or a combination of materials. In particular, the conductive layer 120 may be a conductive layer made from a conductive ink printed or otherwise deposited onto a surface of the substrate 110. In other words, the conductive layer may be a conductive ink printed onto the substrate. The conductive layer may be made of various conductive materials such as MXene material, a MXene carbon material, carbon black ink, graphene ink, silver ink, and/or gold ink. Accordingly, the conductive layer 120 may be selected from the group consisting of a MXene material, a MXene carbon material, carbon black ink, graphene ink, silver ink, and gold ink. A conductive ink may be printed using inkjet printing, screen/mask printing, and/or using another material deposition approach. The conductive layer 120 may use particular materials depending on priorities related to cost, conductivity, and/or chemical resilience.

The conductive layer 120 in particular may be an ink-jet printed layer using a conductive ink. An ink-jet printed layer may have a material form substantially different from a layer printed using screen printing. An ink-jet printed layer can have reduced pore/feature sizes compared to screenprinted ink layer. Additionally, the ink-jet printed layer may be made substantially thinner and have topographic features (such as pores and fractures) sizes substantially smaller compared to a screenprinted ink layer. An inkjet printed conductive layer in one variation may be approximately a micron thick (e.g., 1-10 micrometers) and have topographic features sized on the scale of 5-500 nm. For example, the conductive layer may be an inkjet printed conductive layer that is approximately 10 nm in thickness. However, in some variations, screen printing may be used as an alternative conductive layer 120. Accordingly, a variation may include a conductive screenprinted layer. A conductive screenprinted layer in some implementations may have layer thickness 10-100 micrometers and may have topographic feature sizes 2-10 micrometers.

In some variations, the conductive layer 120 may include layers of two or more different conductive materials. In one example, a MXene or MXene carbon layer may be directly printed on the substrate 110 and a gold or silver may be printed on top of the MXene or MXene carbon layer. In such a variation, the conductive layer 120 may include a MXene conductive layer adjacent to the substrate and a gold or silver conductive layer between the MXene conductive layer and the MIP 130 layer. As a similar variation, a MXene conductive layer 122 may include or integrate gold nanoparticles, silver nano rods, or other conductive nanoparticles, contributing to high conductivity.

In one preferred variation, there is a single conductive layer 120 that can be stimulated as a whole region for the working electrode. In some alternative variations, there may be distinct sub-regions with partitioned or isolated portions of the conductive layer 120. Accordingly, the conductive layer may include conductive sub-regions isolated to sub-sections of a working electrode. In this way, stimulation and sensing could be isolated to sub-regions of the adjacent MIP layer 130. If those sub-regions of the MIP layer 130 correspond to imprintation of different molecules, then different types of molecules could be measured within a shared electrode by switching between different conductive sub-regions.

Alternatively, when integrated into a sensing electrode system, multiple distinct working electrodes may be included, which can be individually selected. More generally, if different analytes are to be tested then there may be multiple sensing electrode systems.

Figure 11:
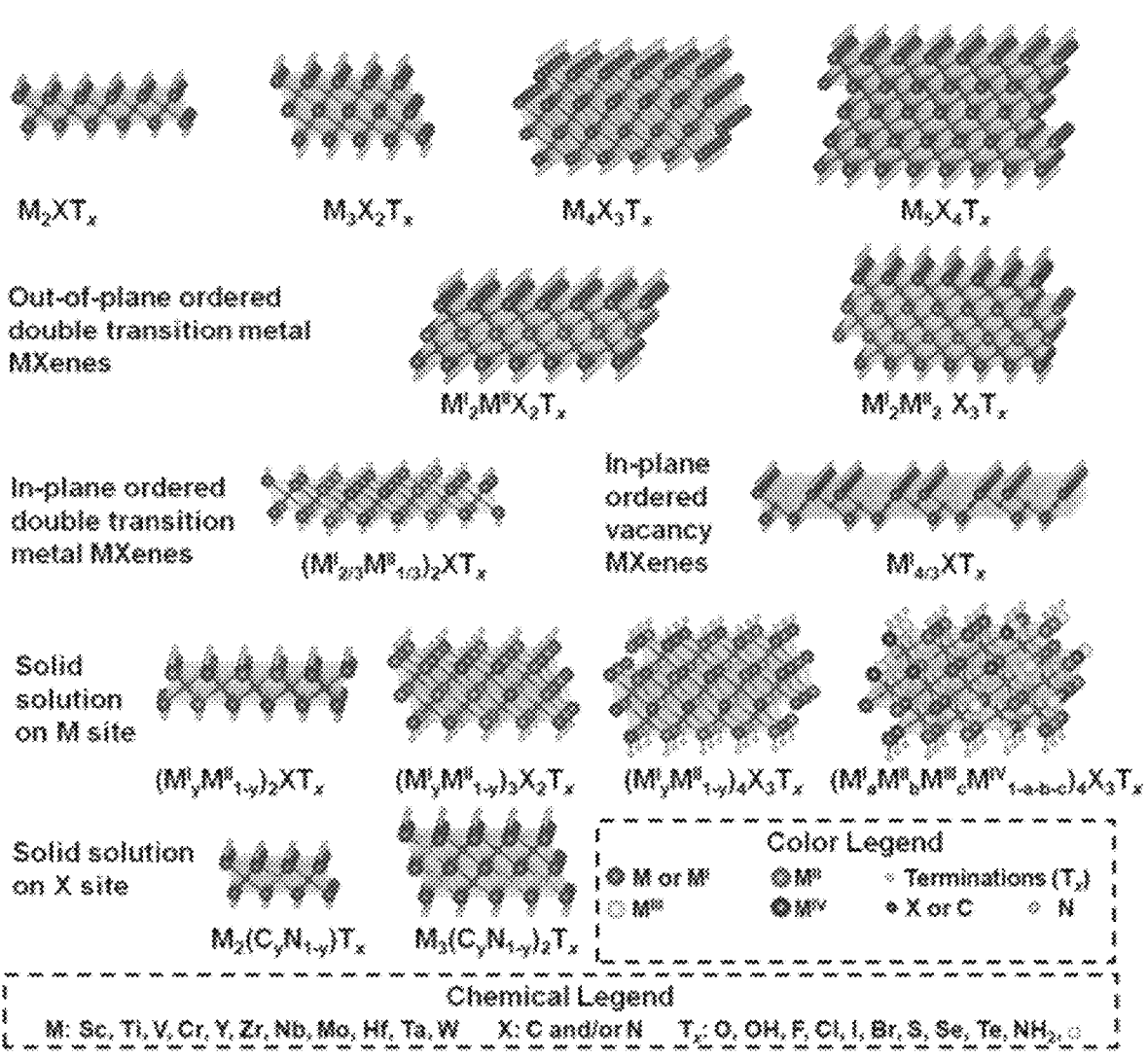
FIG. 11 is a representative chart of different MXene material variations.

A MXene conductive layer 122 can be made of a variety of MXene material options. A MXene material is preferably characterized as a nanostructured, layered, metal carbide or nitride material of a few atoms in thickness with a formula of $M_{n+1}X_n T_x$. This MXene material may be produced by etching an "A" layer from a Mn+1AXn, performing sonication to yield a resulting MXene. This may include producing M2X from $M_3A_x$, producing $M_3X_2$ from $M_3AX_2$, and/or producing $M_4X_3$ from $M_4AX_3$. As shown in FIG. 11, the MXene material may utilize a variety of forms.

In MXene, M could be selected from possible elements such as titanium (Ti), vanadium (V), chromium (Cr), yttrium (Y), zirconium (Zr), niobium (Nb), molybdenum (Mo), hafnium (Hf), tantalum (Ta), and/or tungsten (W), for example. X could be carbon or nitrogen, for example. T may be a functional group (e.g., —OH, —F, =O, etc.). The MXene could be terminated with oxygen for the chlorine or alternatively bromine.

The MXene conductive layer 122 can be intentionally designed as a substantially flat molecule, featuring a carbon backbone with a metallic structure outside. This design allows for various levels of sensitivity and oxidation:

Alternatively, the MXene conductive layer 122 may be designed as a 3D structure to support nanoparticles or other imprint layer geometrical structures, such as beads. This flexible design enables the MXene layer to adapt to different applications and requirements within the enhanced electrode system. As mentioned in some variations, gold nanoparticles, silver nano rods, or other conductive nanoparticles may be integrated within a MXene conductive layer 122.

The molecular imprinted polymer (MIP) layer 130 functions as layer in the enhanced electrode 100. The MIP layer 130 plays a crucial role in detecting targeted molecules through its specifically defined cavities.

The MIP layer 130 may use any suitable material for a conductive MIPs, which may include polypyrrole, polyaniline, poly(3,4-ethylenedioxythiophene) polystyrene sulfonate (PEDOT:PSS), polydopamine, and polyphenylenediamine.

The MIP layer 130 includes defined cavities of a targeted molecule. The defined cavities are preferably formed by imprinting targeted molecules. A template molecule which could be the targeted molecule of the analyte, or geometrically similar molecules may be used in forming the molecular imprints. The defined cavities may be prepared or designed to be substantially empty when first used for sensing, allowing for interaction with the analyte (i.e., the targeted molecules). When the analyte is present in the sample, this will result in the molecules of the analyte filling these cavities in some proportion. The concentration of the target molecules in the sample will preferably be proportional to the number of cavities filled during exposure to the analyte. The defined cavities are preferably distributed throughout the polymer material of the MIP layer 130.

The targeted molecule may be various types of molecules. Examples of potential targeted molecule may include a cortisol molecule, Glutathione, Lactic Acid, estradiol, testosterone, Perfluorooctanesulfonic acid (PFOS) and/or other per- and polyfluoroalkyl substances (PFAS). However, the system may be configured for detecting other types of analytes.

In one variation, the molecular imprinted polymer layer includes cavities imprinted for sensing a single type of target molecule (or class of molecule).

In another variation, the molecular imprinted polymer layer may have cavities imprinted for sensing a plurality of different types of target molecules. In one example, a biosensor that wants to detect presence of any one of a set of monitored molecules could have a plurality of distinct targeted molecules imprinted for sensing. The MIP layer 130 may be formed using a set of template molecules. In one variation, the ratios of template molecule concentrations used in imprinting the polymer material may be adjusted for different sensing characteristics.

A plurality of cavities may be distributed across a sensing surface of the molecular imprinted polymer layer, increasing the likelihood of interactions with the target molecule. The number of cavities also provides the enhanced electrode 100 with sensing capacity. More cavities may mean that the enhanced electrode 100 can be exposed to more of the targeted molecule before being saturated (e.g., substantially all cavities being filled).

The number of cavities can be controlled by adjusting the concentration of emission analyte (e.g., the targeted molecules used as a template) during the imprinting or casting process. This allows for customization of the sensor's sensitivity and saturation point, making it suitable for various applications.

In use, a cavity can be open or filled depending on the presence of target molecules. The filling of a cavity may result in an increase in impedance, while an empty cavity may lead to a lower impedance. The impedance is preferably proportionally changed based on the number or concentration of cavities filled by an analyte. This change in impedance can be measured and analyzed to determine the presence and concentration of target molecules.

In one variation, the molecular imprinted polymer layer is deposited as a layer in between the hydrogel guard layer and the conductive layer 120. The MIP layer 130 could be substantially flat or an even surface.

Figure 2:
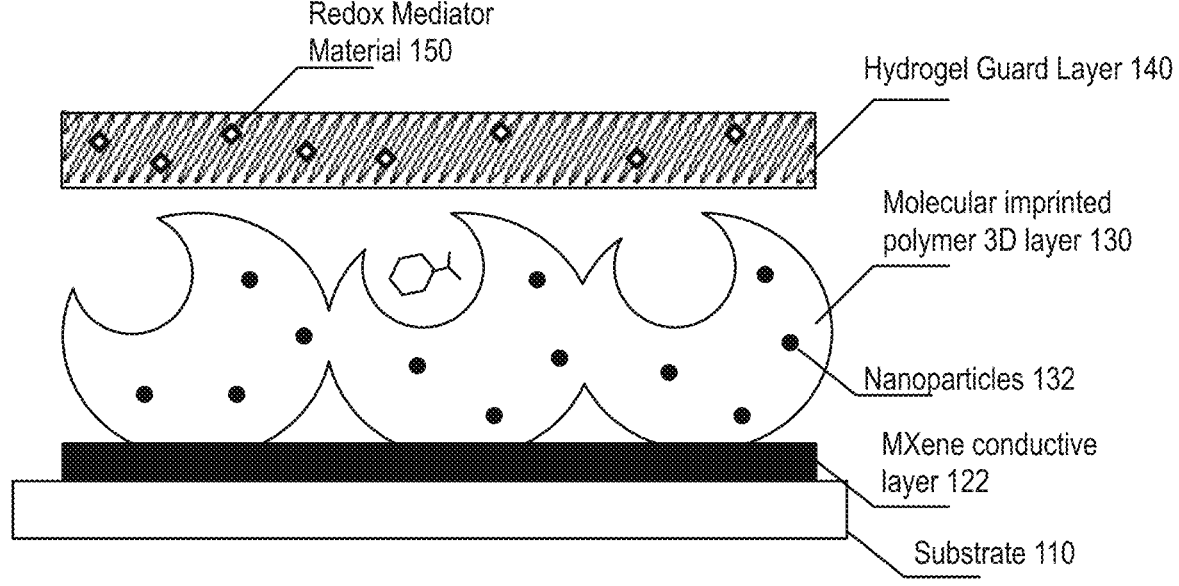
FIG. 2 is a schematic representation of a variation of an enhanced electrode.

In some variations, the MIP layer 130 may be deposited with a non-flat surface—a structured surface. The structured surface may be used to support better imprinting and capture of targeted molecules. As shown in FIG. 2, the molecular imprinted polymer layer may be formed as shells, beads, or spherical forms (e.g., nanoparticles), such that the cavity can support different types of molecular structures. The spherical forms of the MIP layer 130 may include internal defined cavities where the defined cavities extend into the spherical form. A spherical form may provide defined cavities with additional dimensions. The spherical form may additionally increase the size of molecules that can be targeted. Accordingly, in some variations the MIP layer 130 is a layer of MIP spheres or multidimensional forms. The 3D MIP spheres may be chemically formed. A Polymer or other material may be used to adhere or layer the MIP spheres onto the conductive layer 120.

Figure 14A:
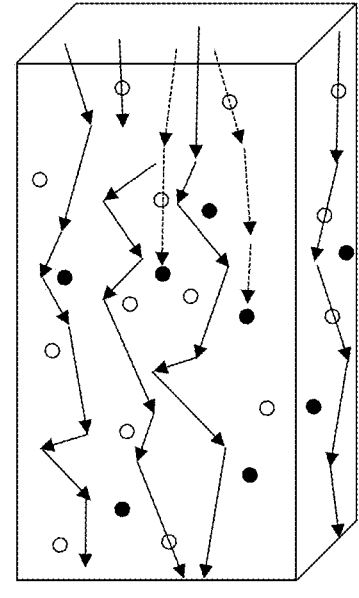
FIG. 14A is a schematic representation of impact of an analyte on electrical pathways through the molecular imprinted polymer layer where electrons make substantially random pathways through the layer.
Figure 14B:
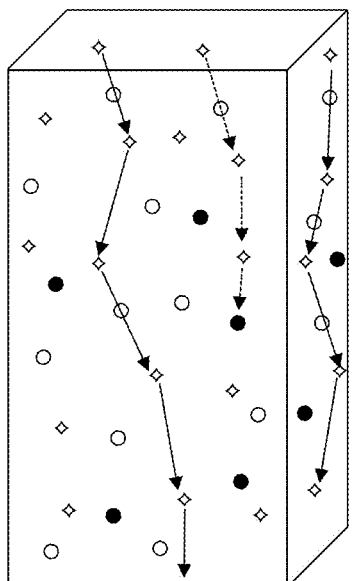
FIG. 14B is a schematic representation of impact of analyte on electrical pathways through the molecular imprinted polymer layer where added nanoparticles establish low energy pathways.

As an additional or alternative variation, the MIP layer 130 may include nanoparticle additives 132, which may function to enhance sensing capabilities. The nanoparticle additives 132 may create lower energy pathways, which can amplify the impact of analyte cavities and unfilled cavities in the MIP layer 130. In variations without integrated nanoparticles, electrical pathways may travel in substantially random paths through the MIP layer as shown in FIG. 14A. Embedded nanoparticles promote pathways that may be easier to block with a molecule captured in a defined cavity. As shown in FIG. 14B, nanoparticles may promote low energy electrical pathways guided by the nanoparticles. In this way, a target molecule captured in a defined cavity can block that pathway to the conductive layer.

The nanoparticles are preferably conductive nanoparticles and may include gold, silver, or other metallic nanoparticles, carbon nanotubes, and/or MXenes (e.g., MXene flakes) that can facilitate a conductive electrical path.

As discussed, by a captured molecules blocking the current, the electrode can detect changes in electrical properties of the electrode (e.g., changes in impedance). With nanoparticles embedded in the MIP layer 130, current can be better obstructed by a captured target molecules due to a lower energy pathway. As shown in FIG. 14B, electrical pathways may be more easily established through pathways formed between nanoparticles and empty cavities. Filled cavities then block electrical pathways which can be seen through more easily detected changes in impedance.

The MIP layer 130 may include one or a combination of different nanoparticles. The nanoparticles may include zero-dimensional nanoparticles, 1-dimensional nanoparticles, 2-dimensional nanoparticles, and/or 3-dimensional nanoparticles. In some variations, the nanoparticles can include carbon-based nanoparticles, carbides (e.g., ceramic) nanoparticles, and/or metallic nanoparticles.

Examples of zero-dimensional nanoparticles may include carbon dots and/or metallicspheres (e.g., silver or gold metallicspheres).

Examples of 1-dimensional nanoparticles may include metallic wires (e.g., silver wires), metal or metal oxide rods, and/or carbon nanotubes (e.g., single or double walled carbon nanotubes).

Examples of 2-dimensional nanoparticles may include graphene, graphene ribbons/lines, and/or rGO (reduced graphene oxide). The 2-dimensional nanoparticles may also include MXene nanoparticles such as MXene flakes. The MXene flakes may be planar sheets or flakes with areas approximately 1 mm by 1 mm though exact dimensions may vary.

Examples of 3-dimensional nanoparticles may include silver nanoprisms, gold nanostars, gold shells, and/or other three-dimensional nanostructures.

In one variation, carbon nanostructures and/or MXenes may be synthesized and then dispersed before polymerization occurs. In another variation, metallic nanoparticles may be created in-situ through electrochemical reduction of metal ions.

In one variation, the MIP layer 130 may also include redox mediators within the layer, enhancing the electrochemical properties of the sensor and resulting in a more efficient and reliable detection mechanism. The redox mediators may be configured or selected to adjust or modify the electrochemical properties for sensing presence of targeted molecules.

The redox mediators may function to enable and calibrate the electrochemical reaction during applied potential. The redox mediators can function as a chemical probe used to measure another molecule. When the enhanced electrode 100 is used to enable biosensing capabilities, the redox mediators may facilitate electron transfer between the point of potential application (at the conductive layer such as a MXene layer) and the target molecules. Their properties, such as reversibility, low potential requirement, and selectivity, may be beneficial for efficient and accurate sensing.

Redox mediators may diffuse and/or otherwise be present in the MIP layer 130. In one variation, the redox mediators 150 are integrated into the hydrogel guard layer 140 and they then diffuse, preferably with any analyte into the MIP layer 130. Analyte molecules can be captured in defined cavities of the MIP layer 130, which can block redox mediator diffusion to the conductive layer, effectively altering the impedance. In this variation, the MIP layer 130 can be a substantially thin layer. Herein thin may be characterized as being 1-20 nanometers. For example, the MIP layer 130 may be a layer 5-15 nanometers such as 10 nanometers. Using diffusion of the redox mediator through a sufficiently thin MIP layer 130 may function to make an electrochemical sensor with a lower detection level (e.g., enhanced sensing able to detect smaller amounts of an analyte).

In another variation, the redox mediator material 150 can be initially distributed through the MIP layer 130. In this variation, the MIP layer may be a substantially thick layer (comparatively to the variation where redox mediators are initially integrated into the hydrogel guard layer 140). Herein, thick may be used to characterize a MIP layer 130 that could be 500 nanometers to more than a micron thick.

The variation for integration of a redox mediator material 150 may depend on the targeted analyte and/or desired sensitivity. For example, a sensor for detection of PFOS may use the variation with the redox mediator material 150 integrated into the hydrogel guard layer 140.

The redox mediators are molecules dispersed or included in the molecular imprinted polymer layer. When the electrode applies potential at the MXene layer the redox mediators react, resulting in oxidation or reduction. Electrons are either pushed or "ripped out" into the redox mediators, creating a current.

The strength of the current depends on the cavities of the molecular imprinted polymer layer. When cavities are full, resistivity increases. When cavities are empty, resistivity is lower or decreases.

Presence of the desired molecules can be determined if the signal goes down, as this indicates the cavities are being filled.

Common redox mediators include methylene blue and Prussian blue. Other redox mediators may alternatively be used. The redox mediator preferably exhibits a substantially reversible electrochemical reactivity count. The redox mediator preferably also is selected/configured for low potentials and non-toxic properties.

High reversibility may be desirable, where oxidation and reduction can cycle with high repeatability. In some implementations, redox mediators may be configured to reduce or oxidize at very low potential (e.g., 0.1 volts), which may extend the sensing lifetime. In some cases, the more often the electrode cycles and gets closer to its maximum potential (e.g., 1 or −1 volts), the more likely it will break, or its performance will degrade. Calibration and/or selection of redox mediators that react at low voltages may function to increase the sensing life of the enhanced electrode 100.

In some variations, the redox mediators may be selected according to the targeted molecule. In some options, multiple varieties of redox mediators may be used. This can enable sensing or targeted multiple molecule types.

The hydrogel guard layer 140 functions to protect or safeguard the enhanced electrode 100 from biofouling and/or to stabilize sensing conditions in the MIP layer 130. The hydrogel guard layer 140 or an alternative layer or element(s) may be used in maintaining the integrity of the below layers by protecting them (in particular the MIP layer 130) from proteins and other particles that could react or interfere with the molecular imprinted polymer layer. In a similar manner, the hydrogel guard layer may additionally function as a filter, preventing larger particles (e.g., macromolecules) such as silica particles or dust from interfering with the molecular imprinted polymer layer. The hydrogel may additionally regulate both the conductivity and temperature of the solution in contact with the electrode. The hydrogel guard layer 140 may additionally function as a vessel for holding and integrating other particles such as the redox mediator material 150.

The hydrogel guard layer may be a variety of different types of hydrogels, which may be selected depending on the use case based on porosity, swelling behavior, mechanical properties, chemical resistance, and/or other specific objectives of the biosensor/electrode application. The hydrogel guard layer may be made of PVA (polyvinyl alcohol) or chitosan, though other suitable materials may alternatively be used. The hydrogel guard layer 140 may additionally be formed using addition of potassium hydroxide (KOH) or sucrose. KOH is one example of a cross-linker that can be used in forming the hydrogel layer but other suitable cross-linkers may be used. Sucrose in particular may be included when forming the hydrogel layer and then later dissolved so as to establish defined channels through the hydrogel guard layer 140. The sucrose forms chains across the hydrogel layer structure and then exposes opened nano/microchannels when the sucrose is removed. The channels in some variations may average 2 micrometers (e.g., 1-5 micrometer channels).

In one variation, the hydrogel guard layer 140 may be prepared and formed through hydrolysis of PVA with KOH. A PVA and KOH mixture can be poured into a mold which is then vacuum dried (e.g., at 70 degrees Celsius).

The hydrogel guard layer 140 is preferably implemented as thin films. Alternatively the layer may be implanted as pads or a layer/collection of beads. The guard layer can be single or multimaterial. Polymers may be blended or modified to improve performance of the guard layer. The hydrogel guard layer will generally be a flexible layer. In some variations, the hydrogel guard layer 140 can be absorbent able to swell up to three times a dry thickness (i.e., the thickness when in a dry state).

The hydrogel guard layer 140 may be tuned or selected based on desired porosity. Variations in in pore size of the hydrogel guard layer may be used to accommodate different target molecules and applications. In some variations, the hydrogel guard layer 140 may include defined channels. For example, microfluidic channels or "microtubes" may be defined through the hydrogel guard layer 140 to facilitate transport of particles to the MIP layer 130, filtered by particle size based on sizing of the channels. The channels may be on average be 1-5 micrometer in diameter (e.g., around 2 um). The channels may be randomly arranged through structure of the hydrogel guard layer 140. The defined channels may help make the sensor work fast for diffusing sample into the MIP layer 130. In some variations, the hydrogel may increase rate of sample absorption by three times.

When integrated as part of a sensing electrode system 200, the hydrogel guard layer 140 may additionally extend over and connect with the other electrodes (e.g., the reference electrode 210 and the counter electrode 220). The hydrogel guard layer 140 in this way can function as the connective layer between the different electrodes.

Additionally, the hydrogel guard layer may exhibit antibacterial properties, effectively preventing fungal or bacterial growth on the electrode surface. This enhances both the durability and accuracy of the device in various environments.

The hydrogel guard layer 140 may additionally include additives to balance ionic strength. The hydrogel guard layer 140 preferably has an ionic strength similar or otherwise compatible with the expected sample. For example, saliva has an ionic strength in the range of 35 to 235 mM (millimolar). Accordingly, the hydrogel guard layer 140 may have an ionic strength 35 to 235 mM. More generally, the hydrogel guard layer 140 preferably has an ionic strength that is within an order of magnitude similar to an expected sample. In one variation, the hydrogel guard layer 140 may include phosphate buffer saline (PBS) additive which has an ionic strength of approximately 100 mM for 1×PBS.

In some variations, the hydrogel guard layer 140 may include an integrated redox mediator material 150. The redox mediator material 150 can be dispersed or otherwise integrated into the hydrogel guard layer 140. The redox mediator material 150 can facilitate furthering the protection and normalization of conditions for the electrode. In some variations, the hydrogel layer 140 may be saturated with a redox mediator material 150 and a salt so as to promote steady state concentration and a fixed ionic strength. This may be used to prevent variable ionic conditions of a sample from altering the analyte measurement. For example, with the redox mediator material, the hydrogel guard layer 140 can mitigate the impact ions in a sample with a high concentration of ions will have on measurement of the analyte at the MIP layer 130. The ions can be captured through ionic interactions with the redox mediator material, thereby preventing or reducing interference with electrochemical impact of the ions within the MIP layer 130.

Figure 15:
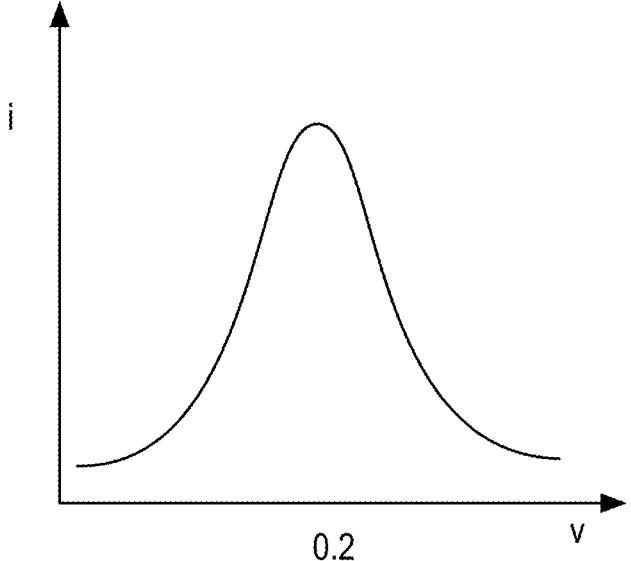
FIG. 15 is a graph of an exemplary voltammetry response.

The redox mediator may be various redox mediator materials methylene blue, congo red, a ferricyanide and ferrocyanide, prussian blue, indophenol, diphenylamine, 2,6-Di-tert-butyl-p-cresol, 2,4-Dinitrophenylhydrazine, and/or tetrazolium salts. Accordingly, the redox mediator material may be selected from a group of redox mediator materials consisting of methylene blue, congo red, a ferricyanide and ferrocyanide, prussian blue, indophenol, diphenylamine, 2,6-Di-tert-butyl-p-cresol, 2,4-Dinitrophenylhydrazine, and tetrazolium salts. In one variation, a redox mediator 150 may include a pair of ions functioning as a redox pair. The redox pair may be selected so as to respond roughly at the same potential regardless of the electrode composition. In one example, the redox mediator may include ferricyanide and ferrocyanide as a redox pair. Methylene blue and Prussian blue are other examples of a redox mediator materials 150. Redox pairs may produce measurable current when the electrode reaches a certain potential in voltammetry such as shown in the exemplary voltammetry response in FIG. 15.

Figure 12:
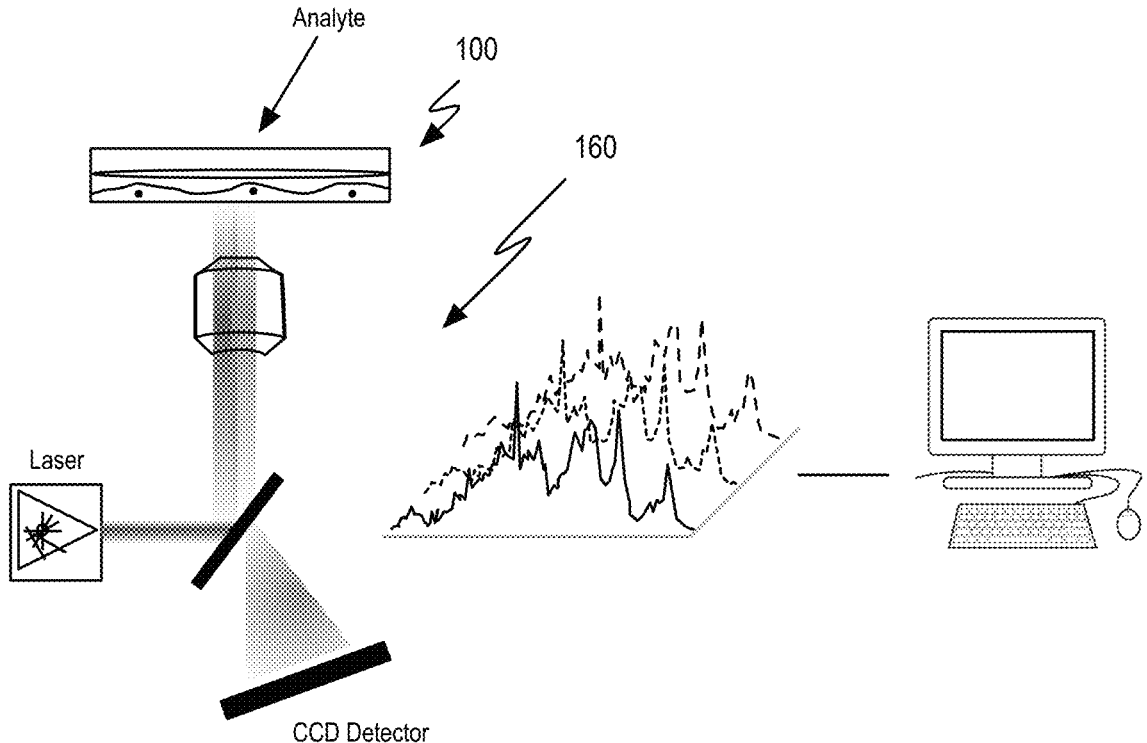
FIGS. 12 and 13 are schematic representations of optical sensing system variations.
Figure 13:
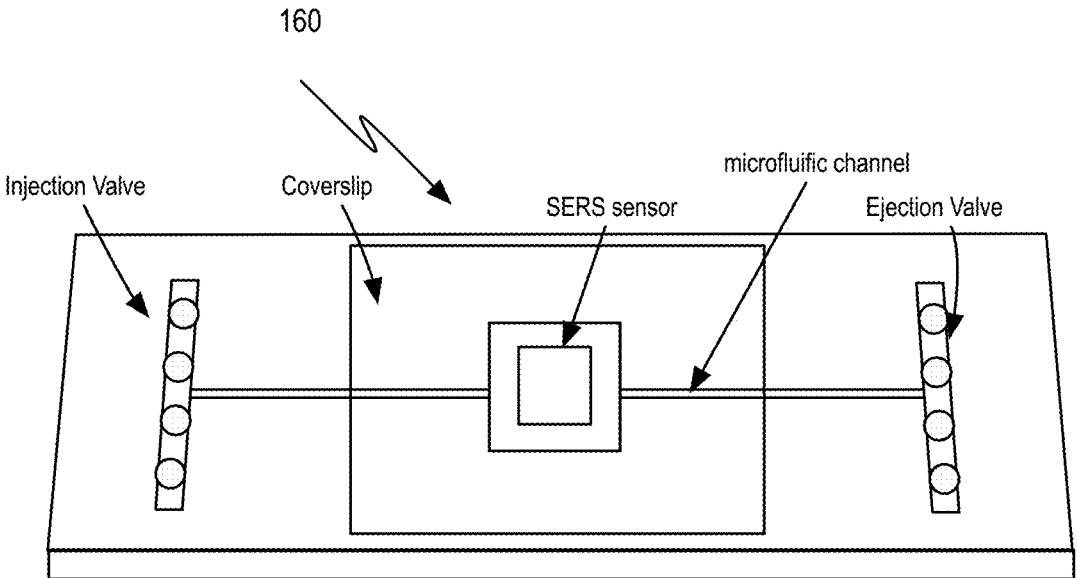

In some variations, a system for the enhanced electrode may additionally include an optical detector system 160 that can be used in combination with electrochemical sensing. The optical detector system 160 may provide an optics-based signal related to presence of the targeted molecule. In one variation, the optical detector system 160 may use Raman spectroscopy as shown in FIG. 12. In an optical system using Raman spectroscopy, an element applies a light and measures scattering of light caused by presence (and/or lack of presence) of molecules in the molecular imprinted polymer layer 130. In this way, the optical detector system 160 is directed to perform Raman spectroscopy through the molecular imprinted polymer layer. In another variation, as shown in FIG. 13, the optical detector system 160 may use a SERS (surface-enhanced Raman spectroscopy) sensor system using a laser to amplify a response.

In some alternative embodiments the enhanced electrode 100 may be integrated into a sensing electrode system 200. A sensing electrode system 200 of one preferred embodiment may include an enhanced working electrode (100), a reference electrode 210, and a counter electrode 220 as shown in FIG. 3. The sensing electrode system 200 functions to provide a full sensing system where the enhanced electrode described herein can use additional electrodes to provide calibration and reference signals for better interpretation of the measurements from the enhanced electrode.

As the working electrode may lend itself to 2D printing/deposition fabrication, the other electrodes may similarly be constructed using 2D printing and/or deposition fabrication techniques. Accordingly, the working electrode (or more specifically the conductive layer of the working electrode), the reference electrode, and the counter electrode, may be printed on a shared substrate surface. The hydrogel guard layer 140 of the enhanced working electrode 100 may extend over and similarly be an outer layer covering the reference electrode 210 and the counter electrode 220. In this way, the hydrogel guard layer 140 may be the connective layer between all electrodes.

The sensing electrode system 200 may be used as part of a potentiostat. In a potentiostat variation, current is flowed through the sensing electrode system 200 from the counter electrode 220 to the working electrode 100 from which current and/or impedance may be measured. Additionally a voltage potential difference may be measured between the reference electrode 210 and the working electrode 100.

The electrode system 200 may be a single electrode used within some other system. In some variations, an array or plurality of the electrode system may be used to provide multiple points of measurement. In some cases, different electrode systems 200 in a set of electrode systems may be configured for sensing different targeted molecules.

The enhanced working electrode 100 functions to provide a primary sensing of an electrochemical reaction with a targeted molecules to monitor presence of an analyte. The enhanced working electrode 100 is preferably one such as described herein.

The reference electrode 210 functions to provide a reference potential against which the potential of a working electrode may be compared and measured. It may provide a zero potential reference. The reference electrode may be made of a stable material such as silver or silver chloride. In one variation, it may be produced and formed using silver ink. Any alternative electrode material may be used.

The counter electrode 220 functions to complete an electrical circuit in the sensing electrode system. The counter electrode 220 may serve as a source or sink for current involved in a redox reaction occurring at a working electrode. The counter electrode, in some variations, may be made using carbon, gold, or other suitable material.

The three electrodes may be all printed and/or deposited as a sensing system stack on a shared substrate. The working electrode 100 may use the electrochemical sensing electrode stack described herein. The reference electrode 210 and/or the counter electrode 220 may be made from conductive ink printed on the substrate 110. The three electrodes will generally be conductively isolated such that the conductive layers of each electrode does not touch thereby establishing a short in the system. Each electrode may connect independently through a potentiostat. The electrodes of the potentiostat may have various geometrical forms. In some variations, such as when printed or otherwise formed on a flexible substrate, the electrodes may be produced with non-linear paths such as using squiggly patterns, zig-zag patterns, or other geometric patterns, which can function to make the electrodes more resilient to bending.

The electrode system 200 may be implemented in various form factors. The sensing electrode system 200 in one variation may be an electrode system 200 implemented or built within some other system. In some variations, the sensing electrode system 200 may be integrated as part of a testing patch/strip, cartridge, module, or some other testing sampler. A sample collection and management system 310 may be used to control how a sample is exposed to or otherwise put into contact with the sensing electrode system 200. Additionally or alternatively, the sensing electrode system 200 will preferably be conductively coupled and integrated with a sensor controller 320.

Figure 4:
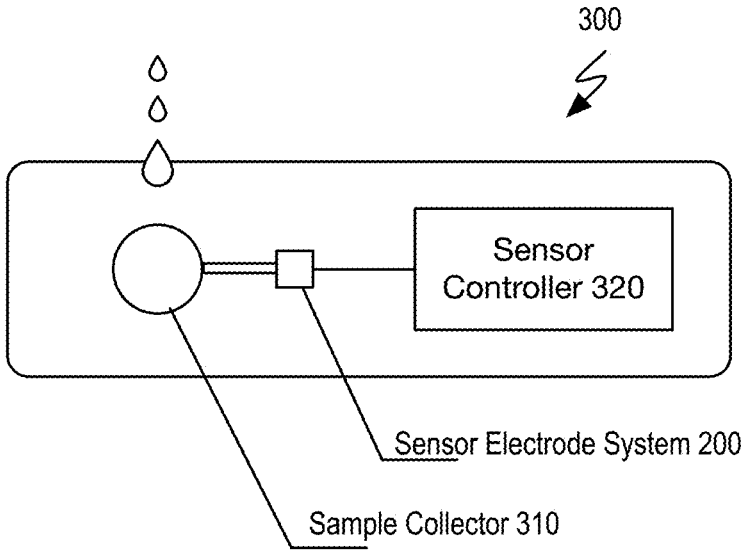
FIG. 4 is a schematic representation of a biosensor device.

In another alternative embodiment, one or more sensing electrode systems 200 may be used within a biosensor device 300. A biosensor device of one preferred embodiment can include one or more sensing electrode systems 200 integrated with a sample collection and management system 310 and a sensor controller 320 as shown in FIG. 4. The biosensor device 300 may be designed with various form factors.

The biosensor device 300 is preferably implemented in some form factor for the intended use. Accordingly, the biosensor device may include a body, frame, or some other suitable structure element(s) that adapt the device for its intended use.

In one exemplary variation, the biosensor device 300 may be a wearable device. In one such variation, the wearable biosensor device could include or be part of an adhesive patch.

In another variation, the wearable biosensor device could be a sensor element attached to or integrated into some other wearable device. The sensor element could be positioned to come into contact or be exposed to an analyte in a sample. As such, in some variations, the sample may be passively collected. For example, as a wearable biosensor device 300, sweat of a user may be collected and directed to the sensing electrode system 200 by a sample collection and management system 310.

In another exemplary variation, the biosensor device 300 includes a body or frame that holds the various components of the biosensor and may include some structure or components to facilitate collection or testing of a sample. The body could be any suitable shape or form and may be made of a variety of materials. The biosensor device 300 may be configured as a testing device where a sample can be deposited or applied to the device and then sensed.

In another exemplary variation, the biosensor device could be configured as a device that is worn inside the mouth or that a user breathes into.

Any other suitable form factor or implementation may alternatively be used.

In some variations, the biosensor device 300 may be a single use device but may alternatively be a multi-use device. As a multi-use device, the sensing electrode system 200 may be a removable component or be integrated into a removable cartridge or component. Multiple tests may be performed by changing the sensing electrode system 200 in the biosensor device 300. In this way, a biosensor device 300 may also be able to perform different tests depending on the type of sensing electrode system 200. For example a biosensor device 300 may detect test a first sample for a first type of analyte using one sensing electrode system 200 (with a MIP imprinted with target molecules of the first type of analyte) and then used to test a second sample for a second type of analyte using another sensing electrode system 200 (with a MIP imprinted with target molecules of the second type of analyte).

In some variations, an electronic or machine-readable identifier may be included with the sensing electrode system 200, and the biosensor device 300 can read or detect the machine-readable identifier, the sensor controller 320 can then adjust sensing based on the identifier. For example different voltammetry signals may be generated depending on the type of sensing electrode system 200. In alternative variations, a user interface may be used to indicate the type of sensing electrode system being used.

The biosensor device 300 may additionally track usage of a sensing electrode system 200 so as to monitor when the sensing electrode system 200 has reached an end-of-life state. Some sensing electrode systems 200 may be usable multiple times depending on the number of samples, volume of samples, quantity of detected analyte, and/or electrical signal conditions in the working electrode 100.

A biosensor system may include one or more sensing electrode systems 200, where the sensing electrode system can be some variation of the sensing electrode system described herein. The sensing electrode system 200 is preferably integrated into the biosensor device 300 and oriented to analyze a sample.

In one variation, the sensing electrode system 200 may be directly integrated into a structure of the biosensor device 300. In another variation, one or more sensing electrode system 200 could be replaceable such that replacement electrode sensor systems can be swapped in after one sensing electrode system 200 has reached its end of use and/or if a new type of sensing electrode system 200 is needed (e.g., needing to test for a different analyte)

The sample collection and management system 310 (i.e., a sample collector) functions to facilitate management of a sample. This may be any suitable system or component that handles directing a sample for analysis by an enhanced electrode. In one variation, the sample collector 310 may be a microfluidic system that receives a sample in one region and then channels it to or over an enhanced electrode. In one exemplary implementation the sample collector 310 may include a paper microfluidic channel that routes a sample over a sensing electrode system. This may be a passive system but could alternatively be an active system where samples are actively moved in a controlled manner.

The biosensor system may additionally include a sensor controller 320 which functions to integrate with and control a sensing electrode system. The biosensor system preferably controls when and how testing is performed. The sensor controller can apply the various voltage potentials to collect readings from the working electrode and the counter electrode.

In one variation, the sample controller 320 can collect multiple test readings. Square wave voltammetry, differential pulse voltammetry, and/or other suitable testing approaches may be used to collect measurements from the sensing electrode system 200.

In a variation that includes an optical system, then the sensor controller 320 may additionally manage control and collection of sensor data from the optical system. The controller 320 or some other device may process data and generate some sensor output.

The biosensor device 300 may include any other suitable components to enable various other features. For example, the biosensor device may include a battery or power source to power the sensing. The biosensor device 300 may include a communication device or component to relay information or data to a connected computing device.

The biosensor device 300 may include one or more user interface components such as an output like a display or speaker and inputs such as buttons or other forms of user input. This may be used to receive control input or present sensed information.

3. Method

Various methods of production and/or operation may be used in connection with the system(s) described herein.

A method S100 for producing an enhanced electrode may include, as shown in FIG. 5, depositing or forming conductive layer S110; depositing or forming a polymer layer S120 and creating imprinted molecular cavities in the molecular polymer layer forming a molecular imprinted polymer layer S130; and depositing a hydrogel guard layer S140. Block S130 may more specifically include imprinting template molecules forming defined cavities of targeted molecules S132 and then removing the template molecules or otherwise emptying the defined cavities S134. As shown in FIG. 6, the method may additionally include depositing or otherwise integrating redox mediator material into the hydrogel guard layer S142 and/or forming microchannels through the hydrogel guard layer S144. The method may additionally include depositing or otherwise integrating nanoparticles into the MIP layer S136. Various other features of the enhanced electrode may additionally be produced or formed through such a method of production.

Block S110, which includes depositing or forming a conductive layer, functions to form the conductive layer of an enhanced working electrode. The conductive layer is preferably deposited onto a substrate surface. The substrate as described herein may be rigid or flexible. The substrate may also be a planar surface or non-planar surface. Depositing or forming the conductive layer may more specifically include printing a conductive ink or material. Printing may include, for example, printing using an inkjet printer or screen printing or mask printing techniques.

The conductive may, for example, be made of a MXene material, a MXene carbon material, carbon black ink, graphene ink, silver ink, and/or gold ink. In some variations, depositing a conductive layer may include printing multiple sublayers. In one variation, this may include printing a base layer of MXene or MXene carbon layer on top of the substrate layer and then depositing or printing a second conductive layer on top of the base layer. The second conductive layer may be formed by printing a layer of gold or silver ink on top of the base layer.

Block S120 and S130, which includes depositing or forming a polymer layer and creating imprinted molecular cavities in the molecular polymer layer forming a molecular imprinted polymer layer, function to form a MIP layer with defined cavities designed to capture targeted molecules of an analyte. Block S130 may more specifically include imprinting a template molecule forming defined cavities of targeted molecules S132 and then removing the template molecules or otherwise emptying the defined cavities S134. The template molecules may be the targeted molecules but may also be or include other molecules of similar or compatible geometries to form cavities that are suitable capture of the targeted molecules. Removing the template molecules can involve various processes such as washing or rinsing the formed MIP layer to physically remove the template molecules, introducing a chemical or reagent to breakdown the template molecule, and/or creating environmental conditions to breakdown the template molecule (e.g., changing pH, temperature, light conditions, etc.).

As discussed herein, in some variations, a thin MIP layer may be desired such as in variations, where a redox mediator is integrated into the hydrogel layer. In this variation, building of by the MIP layer may use 10-15 cycles. If a thicker MIP layer is desired such as when the redox mediator is directly integrated into the MIP layer initially, then more than 15 cycles may be used to build a thick MIP layer (e.g., 500 nm to 1 micron thick).

In some variations, the MIP layer may include nano or micro-meter defined channels. In one variation, nano or micro structures may be formed or integrated into the MIP layer by initially placing nanostructures and then polymerizing on top. In another variation, polymerization may be initially performed when a nanostructure is in solution with a monomer to trap nanostructures within the resulting polymeric matrix.

Block S140, which includes depositing a hydrogel guard layer functions to form a hydrogel guard layer in between the MIP layer and the external environment. The hydrogel guard layer may be layered directly on top of the MIP layer but there could alternatively be intermediate layers.

In some variations, the hydrogel guard layer may benefit from including redox mediator materials. Accordingly, block S140 may include depositing or otherwise integrating redox mediator material into the hydrogel guard layer S142.

In some variations, the hydrogel guard layer may form a uniform matrix. In other variations, the hydrogel guard layer may include microchannels. The microchannels may be formed so as facilitate directed flow of a sample. The channels may be sized and/or formed so as to help filter passing elements from a sample to the MIP layer. Accordingly, block S140 may additionally or alternatively include forming microchannels through the hydrogel guard layer function S144.

In some variations, depositing a hydrogel guard layer may additionally include adding an additive to calibrate an ionic strength of the hydrogel guard layer to a compatible range of a sample. A compatible range can be within an order of magnitude of the range of ionic strength of expected samples. In some variations, this may include adding PBS to target a range 35 to 235 mM (e.g., around 100 mM).

A method S200 for producing an electrode system may include, as shown in FIG. 7, producing an electrode system may include a producing an enhanced electrode as a working electrode S210, producing a reference electrode S220, and producing a counter electrode S230. Various manufacturing methods may be used as part of producing these electrodes. Producing the enhanced electrode may include the variations described herein for method S100. This method S200 may be used in creating a sensing electrode system as described herein.

A method S300 for producing and/or operating a biosensor system, as shown in FIG. 8, may include providing a body of a biosensor device S310, integrating a sensing electrode system S320, and controlling the sensing electrode system for biosensing S330. A sensing electrode system may be produced or formed using method S200 described herein. Integrating a sensing electrode system S320 may permanently integrate the sensing electrode system, which may be the case where the biosensor device is designed to be used with one particular sensing electrode system like in a single use system. In other variations, the sensing electrode system may be interchangeable. In such variations, integrating the sensing electrode system may include receiving a replaceable sensing electrode system.

For a biosensor system usable with replaceable sensing electrode systems, the method may additionally include operations for tracking and taking action to initiate or prompt changing of the sensing electrode system. Accordingly, the method may include tracking usage of the sensing electrode system and triggering an electrode change event upon satisfying a usage condition. The electrode change event may be an alert or indicator to communicate a recommended change of the sensing electrode system. The electrode change event may additionally or alternatively include automatically discharging a current sensing electrode system and loading a new sensing electrode system.

In one variation, tracking usage of the sensing electrode system and triggering an electrode change event upon satisfying a usage condition may include counting the number of sample analyses and triggering the electrode change event when the number of sample analyses is at and/or greater than a set threshold. In other variations, the quantity of an analyte measured for a sensing electrode system may be used. A sensing electrode system may have so much capacity for an analyte and so when the available capacity reaches some upper threshold the system can prompt a user to change the sensing electrode system. The volume or other measure of processed sample may be an additional or alternative property used to determine when to trigger an electrode change event.

A method S400 for operating a sensing electrode system, as shown in FIG. 9, may include receiving a sample exposed to a sensing electrode system S410; and analyzing the sample using the sensing electrode system S420 which may include applying a voltage potential between a reference electrode and a counter electrode S422, reading a reference signal using the reference electrode and counter electrode S424, applying a voltage potential between the enhanced working electrode and the counter electrode S426, and reading the sample signal using the enhanced working electrode and the counter electrode S428.

This method S400 preferably relies on handling and transformations of a sample enabled through an enhanced working electrode described herein. A sample is preferably supplied to the working electrode, and that sample interacts with the stack of the electrodes so as to filter undesirable particles/molecules and ideally create conditions where a targeted analyte is captured in defined cavities in a way that can be electrochemically measured. As such method S400 may additionally or alternatively include, as shown in FIG. 10, receiving a sample at the hydrogel layer of an enhanced working electrode S411, filtering the sample through the hydrogel layer into the MIP layer S412, capturing target molecules of an analyte in the MIP layer S413, and then applying sensing stimulation through a conductive layer S414, and determining a quantification of analyte present in the sample S430.

Filtering the sample through the hydrogel layer into the MIP layer S412 may include filtering through physically blocking diffusion of a sample through the hydrogel. This functions to block large particles, contaminates, and/or large molecules from moving into the MIP layer. Filtering the sample may additionally or alternatively include chemically filtering. This may include chemically filtering through reacting un-desired components of a sample with added molecules in the hydrogel to eliminate interferents.

Block S414 may be performed in connection with S426, and block 430 may be performed as part of or in connection with S428. Determining the quantification of the analyte present in the sample will generally be based on a detected impedance change, which results from an analyte being captured in cavities.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

I claim:

1. A system for an electrode used in electrochemical sensing, comprising:

a conductive layer deposited on a substrate;

a molecular imprinted polymer layer deposited on top of the conductive layer;

a hydrogel guard layer deposited on top of the molecular imprinted polymer layer; and a redox mediator material integrated within the hydrogel guard layer.

2. The system of claim 1, wherein the redox mediator material is selected from a group of redox mediator materials consisting of methylene blue, congo red, ferricyanide and ferrocyanide, prussian blue, indophenol, diphenylamine, 2,6-Di-tert-butyl-p-cresol, 2,4-Dinitrophenylhydrazine, and tetrazolium salts.

3. The system of claim 1, wherein the conductive layer is a MXene conductive layer.

4. The system of claim 3, wherein the MXene conductive layer is a MXene material of the form $M_{n+1}X_nT_x$, where M is selected from a group consisting of titanium (Ti), Vanadium (V), Chromium (Cr), Yttrium (Y), Zirconium (Zr), Niobium (Nb), Molybdenum (Mo), Hafnium (Hf), Tantalum (Ta), and Tungsten (W), where X is carbon or nitrogen, and T is a functional group.

5. The system of claim 1, wherein the hydrogel guard layer is prepared with an ionic strength in a range of 35-235 millimolar.

6. The system of claim 1, wherein the conductive layer is a conductive ink printed onto the substrate.

7. The system of claim 1, wherein the conductive layer comprises a MXene conductive layer adjacent to the substrate and a gold conductive layer between the MXene conductive layer and the molecular imprinted polymer layer.

8. The system of claim 1, wherein the conductive layer is a material selected from a group consisting of a MXene material, a MXene carbon material, carbon black ink, graphene ink, silver ink, and gold ink.

9. The system of claim 1, wherein the molecular imprinted polymer layer comprises defined cavities of a targeted molecule.

10. The system of claim 9, wherein the targeted molecule is a cortisol molecule.

11. The system of claim 9, wherein the targeted molecule is a molecule type selected from a group consisting of cortisol, Glutathione, Lactic Acid, estradiol, testosterone, Perfluorooctanesulfonic acid (PFOS), and per- and polyfluoroalkyl substances (PFAS).

12. The system of claim 1, wherein the molecular imprinted polymer layer is formed as spherical forms with defined cavities extending into the spherical forms.

13. The system of claim 1, wherein the molecular imprinted polymer layer includes integrated nanoparticles.

14. The system of claim 1, further comprising an optical detector system directed to perform Raman spectroscopy through the molecular imprinted polymer layer.

15. The system of claim 1, wherein the substrate is a rigid substrate.

16. The system of claim 1, wherein the substrate is a flexible substrate.

17. A system for electrochemical sensing of an analyte in a sample, comprising:

a sensing electrode system comprising:

a working electrode comprises: a conductive layer deposited on a substrate, a molecular imprinted polymer layer deposited on top of the conductive layer, a hydrogel guard layer deposited on top of the molecular imprinted polymer layer, and a redox mediator material integrated within the hydrogel guard layer, a reference electrode, and a counter electrode; and a sample collector configured to direct the sample to the working electrode.

18. The system of claim 17, wherein the conductive layer of the working electrode, the reference electrode, and the counter electrode are printed on a shared substrate surface of the substrate.

* * * * *